(12) United States Patent
Mesters et al.

(10) Patent No.: US 7,708,967 B2
(45) Date of Patent: May 4, 2010

(54) PROCESS FOR DISPOSAL OF MERCAPTANS

(75) Inventors: Carolus Matthias Anna Maria Mesters, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/444,214

(22) PCT Filed: Oct. 3, 2007

(86) PCT No.: PCT/EP2007/060492

§ 371 (c)(1),
(2), (4) Date: Apr. 3, 2009

(87) PCT Pub. No.: WO2008/040752

PCT Pub. Date: Apr. 10, 2008

(65) Prior Publication Data

US 2009/0324473 A1 Dec. 31, 2009

(30) Foreign Application Priority Data

Oct. 5, 2006 (EP) .................................. 06121813

(51) Int. Cl.
*B01D 53/48* (2006.01)
*C01B 17/04* (2006.01)
*C01B 17/48* (2006.01)
*C01B 17/52* (2006.01)
*C10L 3/10* (2006.01)

(52) U.S. Cl. .................. 423/242.1; 423/542; 423/574.1; 48/127.3; 48/127.5; 48/127.7

(58) Field of Classification Search .............. 423/242.1, 423/542, 574.1; 48/127.3, 127.5, 127.7
See application file for complete search history.

(56) References Cited

U.S. PATENT DOCUMENTS 4,886,649 A 12/1989 Ismagilov et al. ........... 423/230

(Continued)

FOREIGN PATENT DOCUMENTS

EP 409353 1/1991

(Continued)

OTHER PUBLICATIONS

Kohl, A., et al. Gas Purification; $4^{th}$ edition, 1985, Gulf Publishing Co., p. 867-871.

*Primary Examiner*—Timothy C Vanoy
(74) *Attorney, Agent, or Firm*—Charles W. Stewart

(57) ABSTRACT

The invention provides a process for disposal of mercaptans, the process comprising the steps of: (a) contacting a feed gas stream comprising mercaptans with liquid sulphur in a sulphide producing zone at elevated pressure and at a temperature in the range of from 300 to 450° C. to obtain a liquid stream comprising sulphur and sulphide compounds; (b) optionally separating the liquid stream obtained in step (a) into a first liquid phase enriched in liquid sulphur and a second liquid phase enriched in sulphide compounds; (c) combusting at least part of the sulphide compounds at elevated temperature in the presence of an oxygen-containing gas in a sulphur dioxide generation zone using a sulphide burner to which burner oxygen-containing gas is supplied, whereby at least part of the sulphide compounds is converted to sulphur dioxide to obtain a gas stream comprising sulphur dioxide.

10 Claims, 1 Drawing Sheet

U.S. PATENT DOCUMENTS

| | | | |
|---|---|---|---|
| 6,235,259 B1 | 5/2001 | Ledoux et al. | 423/573.1 |
| 2005/0011362 A1 | 1/2005 | Smith | 96/409 |
| 2009/0087368 A1* | 4/2009 | Mak | 423/244.09 |

FOREIGN PATENT DOCUMENTS

| | | |
|---|---|---|
| WO | WO9202449 | 2/1992 |

* cited by examiner

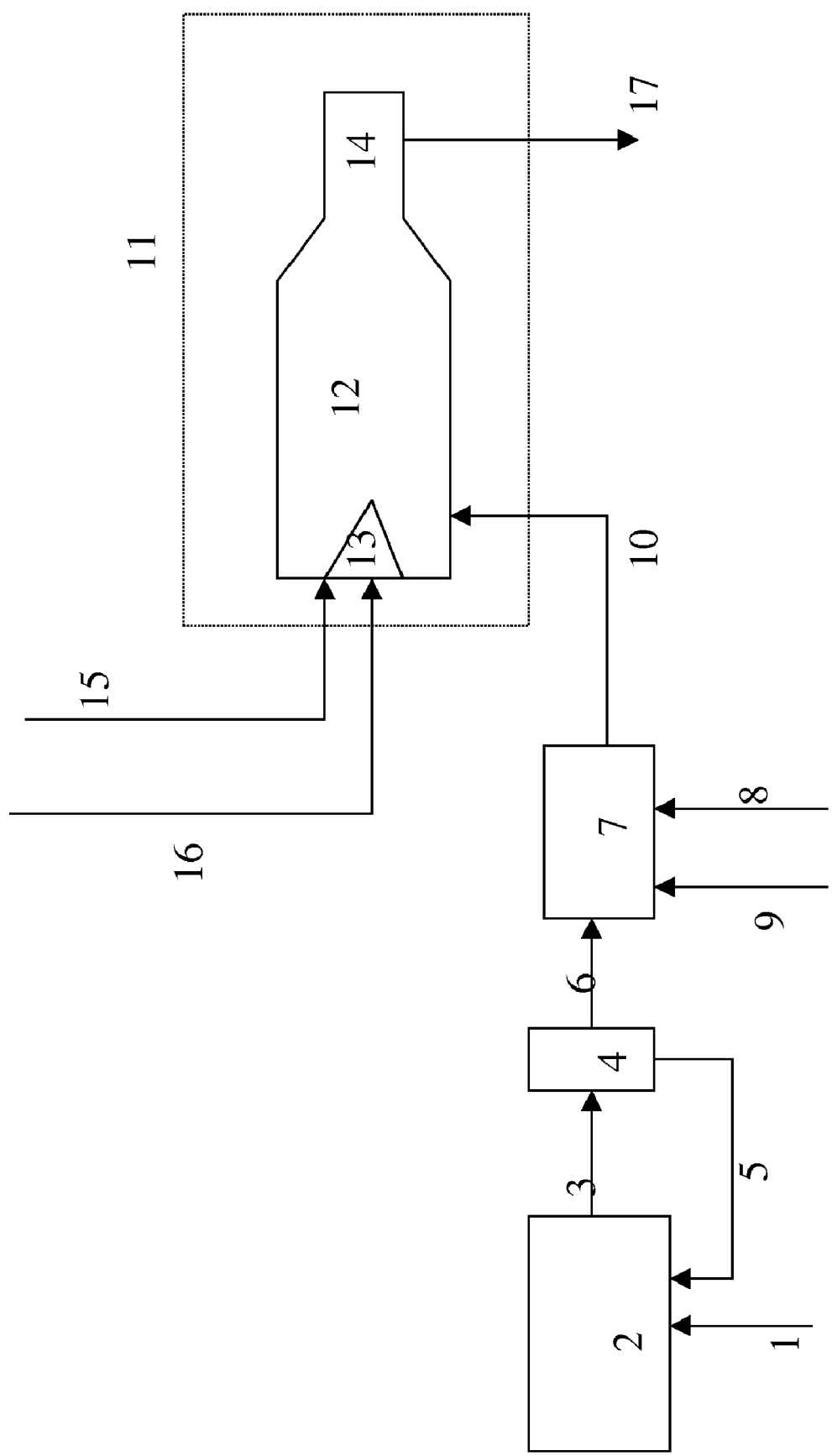

PROCESS FOR DISPOSAL OF MERCAPTANS

The present application claims priority from European Patent Application 06121813.7 filed 5 Oct. 2006.

The invention relates to a process for disposal of mercaptans (RSH).

Numerous natural gas wells produce what is called "sour gas", i.e. natural gas traditionally comprising hydrogen sulphide ($H_2S$), often in combination with mercaptans. In certain regions, especially in the Middle East, sour gas comprising a substantial amount of mercaptans as well as a wider variety in types of mercaptans are produced.

Removal of mercaptans from a natural gas stream comprising mercaptans is important in view of compliance to environmental regulations and/or to meet required product specifications, for example in the production of liquefied natural gas (LNG).

Mercaptan removal is also important in cases where the gas stream is a carrier gas stream, for example an inert gas or a hydrocarbonaceous gas that has been used to strip a mercaptan comprising reactor bed and is loaded with mercaptans. The removal of mercaptans from such a loaded gas stream is necessary to be able to use the gas stream again as stripping gas.

Processes for removal of mercaptans from a gas stream are known in the art. The known processes are usually based on technologies involving removal of mercaptans by absorption of mercaptans into a liquid or adsorption of mercaptans onto a solid (zeolite) adsorbent. Loaded liquid absorbent or loaded solid adsorbent is then contacted with a stripping gas, obtaining a stripping gas loaded with mercaptans. A well-known example of such a liquid absorption process is the Sulfinol process, described for example in A. Kohl and F. Riesenfeld, "Gas Purification", third edition, page 792-796.

Mercaptans can then be disposed off by conversion into di-sulphides as described in R. N. Maddox and D. J. Morgan in "Gas Conditioning and Processing", volume 4: Gas Treating and Liquid Sweetening, Campbell Petroleum Series, Norman, Okla., 1998. Di-sulphide compounds can be used in other processes or products. Examples of the use of di-sulphide compounds are given in A. Kh. Sharipov, "Chemistry and Technology of Fuels and Oils", Vol. 38, p. 280-284 and include the use of di-sulphide compounds as odorants for natural gas for domestic use, for sulphurising of cobalt- and nickel molybdenum catalysts for petroleum refining processes and in agrochemistry. Hydrodesulphurisation is also a commonly used disposal method for di-sulphide compounds.

A drawback of these disposal methods is that they are all fundamentally different from the process wherein mercaptans and eventually di-sulphide compounds are produced. Thus, disposal of RSH involves removal and transport of di-sulphide compounds, followed by processing of the di-sulphide compounds using a separate, dedicated method. Often, expensive and sensitive catalysts need to be employed to enable processing of di-sulphide compounds.

Another drawback is that the amount of mercaptans and di-sulphide compounds which can be disposed of using these specialised methods is limited.

Thus, there is a need for a simple and effective method for disposal of mercaptans, preferably enabling disposal of mercaptans to be done in the same process line-up as the one wherein the mercaptans compounds are removed. In addition, disposal of relatively large amounts of mercaptans is desired.

It has now been found that by contacting a feed gas stream comprising mercaptans at elevated pressure and at elevated temperature with liquid sulphur, mercaptans can be converted to sulphide compounds.

Therefore, the invention provides a process for disposal of mercaptans, the process comprising the steps of:
(a) contacting a feed gas stream comprising mercaptans with liquid sulphur in a sulphide producing zone at elevated pressure and at a temperature in the range of from 300 to 450° C. to obtain a liquid stream comprising sulphur and sulphide compounds;
(b) optionally separating the liquid stream obtained in step (a) into a first liquid phase enriched in liquid sulphur and a second liquid phase enriched in sulphide compounds;
(c) combusting at least part of the sulphide compounds at elevated temperature in the presence of an oxygen-containing gas in a sulphur dioxide generation zone using a sulphide burner to which burner oxygen-containing gas is supplied, whereby at least part of the sulphide compounds is converted to sulphur dioxide to obtain a gas stream comprising sulphur dioxide.

The FIGURE is a schematic diagram depicting the process flow of one embodiment of the inventive process.

Reference herein to sulphide compounds is to di-sulphide and/or polysulphide compounds.

The process enables disposal of mercaptans in a relatively easy and straightforward way. Because removal of sulphur contaminants from a gas stream is usually done in an overall process line-up which includes a so-called Claus unit, disposal of mercaptans can be performed using the Claus unit, as will be described further on. An elegant incorporation of disposal of RSH into the overall treating line-up can thus be achieved.

The sulphur dioxide formed after combusting the sulphide compounds is preferably disposed of by reacting it with hydrogen sulphide to elemental sulphur. In this preferred embodiment, no unwanted emission of sulphur dioxide into the atmosphere takes place.

The elemental sulphur may be used without elaborate further processing, for example as an ingredient for fertilisers, cement or asphalt.

In step (a), a feed gas stream comprising mercaptans is contacted with liquid sulphur in a sulphide producing zone at elevated pressure and at elevated temperature to remove mercaptans. Reference herein to mercaptans is to aliphatic mercaptans, especially $C_1$-$C_6$ mercaptans, more especially $C_1$-$C_4$ mercaptans, aromatic mercaptans, especially phenyl mercaptan, or mixtures of aliphatic and aromatic mercaptans. The invention especially relates to the removal of methyl mercaptan, ethyl mercaptan, normal- and iso-propyl mercaptan and butyl mercaptan isomers.

The process according to the invention is especially suitable for feed gas streams comprising a substantial amount of mercaptans, preferably more than 4 ppmv of mercaptans. The process is advantageously used for feed gas streams wherein the concentration of mercaptans is in the range of from 5 ppmv to 1 vol %, preferably from 10 ppmv to 1 vol %, based on the total feed gas stream.

The process is especially suitable for processing a feed gas stream obtained after stripping mercaptans from a zeolite adsorbent bed in order to regenerate the zeolite adsorbent bed. Such a feed gas stream will be a relatively small stream with respect to the overall gas stream in a gas treating line-up and will comprise a substantial amount of mercaptans.

Suitably, step (a) is performed at a pressure sufficiently high to keep at least a substantial part of the mercaptans dissolved in the liquid sulphur. Preferably the operating pressure of the sulphide producing zone pressure is chosen such that at least 50%, more preferably at least 70% and most preferably at least 80% of the mercaptans is dissolved in the liquid sulphur.

Without wishing to be bound by any theory with regard to the reactions taking place in step (a), it is believed that mercaptans react to form di-sulphides and/or polysulphides. It is believed that these sulphide compounds can then react further to form carbon di-sulphide and hydrogen sulphide. Thus, in a preferred embodiment any hydrogen sulphide present in the liquid sulphur is removed. By removing hydrogen sulphide, the equilibrium reaction is shifted towards formation of di-sulphide and/or polysulphide compounds.

Hydrogen sulphide may be removed from the liquid sulphur in any way, for example by adding a hydrogen sulphide sorbent to the liquid sulphur phase. Preferably, a hydrogen sulphide solid adsorbent is used comprising one or more metals or oxides of metals or combinations thereof, the metals being selected from the group of Ag, Sn, Mo, Fe and Zn. An especially preferred solid adsorbent is ZnO, because of its good performance.

Alternatively, the hydrogen sulphide may be selectively oxidised by adding oxygen and an oxidation catalyst to the liquid sulphur phase. Such oxidation catalysts are known in the art and typically comprise an oxide and/or a sulphide compound of one or more metals. Reference herein to an oxide compound of one or more metals is to a compound of the approximate general formula $MS_{x-1}O_y$, wherein M is one or more metals, and x and y have, independently, a numeric value of at least 1. Reference herein to a sulphide compound of one or more metals is to a compound of the approximate general formula $MS_xO_{y-1}$. When contacted with $H_2S$, the metal oxide compound will be converted to a metal sulphide compound and water is formed. When the thus-formed metal sulphide compound is then contacted with oxygen, it is converted into the metal oxide compound and elemental sulphur is formed. These two subsequent reactions are symbolically represented by the following equations:

$$MS_{x-1}O_y + H_2S \rightarrow MS_xO_{y-1} + H_2O \quad (1a)$$

$$MS_xO_{y-1} + \tfrac{1}{2}O_2 \rightarrow MS_{x-1}O_y + S \quad (1b)$$

The overall reaction is the selective oxidation reaction according to equation (3).

$$2H_2S + O_2 \rightarrow 2H_2O + 2/n\,S_n \quad (1)$$

It will be appreciated that the proportion of oxygen and sulphur in the catalyst metal compound will vary during the catalytic process. The compound having the highest proportion of oxygen is represented as $MS_xO_{y-1}$ in equations (1a) and (1b) and referred to as oxide. The compound having the highest proportion of sulphur is represented as $MS_{x-1}O_y$ and referred to as sulphide.

The metal M may for example be vanadium, chromium, manganese, iron, cobalt, molybdenum or combinations thereof. Examples of prior art catalysts for the selective oxidation of $H_2S$ are iron oxide-chromium oxide on silica, iron oxide-phosphorus oxide on silica, iron oxide-sodium oxide on silica (EP-A-0409353) magnesium chromite on alumina, vanadium pentoxide on alumina (U.S. Pat. No. 4,886,649) and silicon carbide supporting an active phase comprising nickel in the oxysulfide form (U.S. Pat. No. 6,235,259). Preferably, the catalytically active material is an oxide and/or sulphide compound of iron or an iron comprising mixed metal oxide and/or sulphide compound, more preferably the catalytically active material comprises a hydrated iron oxide compound.

Step (a) results in a liquid stream comprising sulphur and sulphide compounds. In a preferred embodiment, the process includes step (b) wherein the liquid stream obtained in step (a) is separated into a first liquid phase enriched in liquid sulphur and a second liquid phase enriched in sulphide compounds, suitably using a liquid/liquid separator. The second phase enriched in sulphide compounds is then subjected to step (c). The first liquid phase enriched in liquid sulphur is preferably recycled to step (a).

In step (c), at least part of the sulphide compounds are combusted at elevated temperature in the presence of an oxygen-containing gas in a sulphur dioxide generation zone using a sulphide burner, whereby at least part of the sulphide compounds is converted to sulphur dioxide ($SO_2$) to obtain a gas stream comprising $SO_2$.

Preferably, at least 50%, more preferably at least 80% and most preferably at least 90% of the sulphide compounds are combusted.

It is believed that complete combustion of the sulphide compounds results in the formation of water, sulphur dioxide and hydrocarbons.

Incomplete combustion, for example if oxygen is present in an amount less than what is stochiometrically needed for complete combustion, can lead to the unwanted formation of carbon monoxide. Thus, preferably the amount of oxygen-containing gas in step (c) is sufficient to combust at least 80% of the sulphide compounds to sulphur dioxide.

To further avoid incomplete combustion, in a more preferred embodiment the amount of oxygen in the oxygen-containing gas supplied to the sulphide burner corresponds to an amount of oxygen at least equal to the stoichiometric amount needed to convert the sulphides to sulphur dioxide and to the corresponding combustion products. Even more preferably, an excess of oxygen is used, preferably such that the exhaust gas exiting the sulphur dioxide generation zone comprises in the range of from 1 to 3, preferably 1.5 to 2 vol % of oxygen-containing gas.

Suitable oxygen-containing gases include air, oxygen-enriched air or an oxygen-enriched inert gas. The amount of oxygen present in the oxygen-containing gas can vary widely and is suitably in the range of from 10 v/v % to 100 v/v %, based on the total oxygen-containing gas.

Preferably, the combustion of sulphide compounds is done at temperatures in the range of from 700° C. to 1800° C., more preferably from 800° C. to 1700° C., and even more preferably from 1100 to 1400° C. At the preferred temperature ranges, combustion proceeds at a favourable rate while conversion of sulphide compounds to sulphur dioxide is high.

It is believed that the combustion of sulphide compounds is an autothermal process. Only at the start-up, heat needs to be supplied in order to heat up the sulphur dioxide generation zone to temperatures above the ignition temperature of the sulphide compounds, typically 440 to 460° C. After achieving the process temperature of 700 to 800° C., and start of sulphide combustion, the temperature will remain high as a result of the exothermic combustion reaction.

The sulphur dioxide generation zone comprises a sulphide burner, to which the sulphide compounds and oxygen-containing gas are fed. The sulphide burner is used to convert sulphides to sulphur dioxide to obtain a gas stream comprising sulphur dioxide. Suitable sulphide burners are burners commonly applied in the Claus process.

A preferred way to feed the sulphide compounds to the sulphide burner is by spraying the liquid stream comprising sulphur and sulphide compounds or the second liquid phase enriched in sulphide compounds into the sulphide burner. This results in an enlargement of the surface of sulphide compounds and enhances the conversion of sulphide compounds to sulphur dioxide. The spraying can for example be done via a nozzle. Optionally, a spraying medium can be added to the sulphide compounds as a diluent, to further increase the contact area. Suitable spraying mediums are mediums which will not react in any way with the sulphide compounds and include nitrogen gas or water vapour.

In a preferred embodiment, the process further comprises step (d), wherein the gas stream comprising sulphur dioxide is reacted with a gas stream comprising hydrogen sulphide in the presence of an oxygen-containing gas to obtain elemental sulphur. Without wishing to limit the invention to a specific reaction path, it is believed that hydrogen sulphide (H$_2$S) is converted to elemental sulphur following reaction (3), known in the art as the so-called Claus reaction.

$$2H_2S + SO_2 \rightarrow 2H_2O + 3/nS_n \quad (3)$$

Preferably, step (d) takes place in the presence of a catalyst. This enables a higher conversion of H$_2$S to elemental sulphur. Suitable catalysts include activated alumina and titania catalysts. Catalysts with areas over 300 m$^2$/g, macroporosities over 0.15 ml/g, and macropore radii as high as allowed by pellet density are preferred as they show enhanced performance. Other suitable catalysts include activated bauxite (surface area of 184 m$^2$/g) and cobalt-molybdenum hydrogenation catalysts (surface area of 270 m$^2$/g).

In a preferred embodiment, the sulphide burner is complemented by an acid gas burner. Oxygen-containing gas and a gas stream comprising hydrogen sulphide are fed to the acid gas burner, thereby converting at least part of the hydrogen sulphide to sulphur dioxide following reaction (4).

$$2H_2S + 3O_2 \rightarrow 2H_2O + 2SO_2 \quad (4)$$

The combination of reactions (3) and (4) is known in the art as the Claus process. The Claus process is frequently employed in refineries for the processing of H$_2$S recovered from natural gas or other sources. The Claus process is suitably performed in a Claus unit comprising a combustion chamber, wherein reaction (4) takes place, and an elemental sulphur producing zone, wherein reaction (3) takes place. The Claus process is frequently employed both in refineries and for the processing of H$_2$S recovered from natural gas.

As most line-ups for gas treating, i.e. removal of contaminants from a gas stream, include a Claus unit, the process according to the present invention is preferably performed using a Claus unit. Thus, preferably, the sulphur dioxide generation zone is a Claus combustion chamber, meaning that the acid gas burner and/or the sulphide burner are coupled to or located in the combustion chamber of a Claus furnace.

In an especially preferred embodiment the sulphide burner and the acid gas burner are located in the combustion chamber of the Claus unit.

Preferably, the exhaust gas of the sulphide burner and optionally of the acid gas burner is adiabatically conveyed to the combustion chamber of a Claus furnace. The exhaust gas of both burners comprises sulphur dioxide.

Combustion of H$_2$S to SO$_2$ (reaction (4)) is suitably done at high temperatures, generally in the range of from 1000 to 1400° C., while the formation of elemental sulphur (reaction (1)) is suitably performed at lower temperatures, generally in the range of from 200 to 350° C. Preferably, the amount of oxygen-containing gas supplied to the acid gas burner is sufficient to combust at least 70%, more preferably at least 80% of the hydrogen sulphide to sulphur dioxide.

Preferably, the total amount of oxygen-containing gas, the total amount being the sum of oxygen-containing gas fed to the sulphide burner and optionally to the acid gas burner, is sufficient to combust at least 80% of the sulphide compounds to sulphur dioxide and optionally to convert at least 70% of the hydrogen sulphide to sulphur dioxide. It will be understood that the amount of oxygen-containing gas fed to the sulphide burner and/or to the Claus acid gas burner can be adjusted in order to achieve the desired conversions.

The oxygen-containing gas may be supplied to the sulphide burner and to the acid gas burner using a common supply conduit which branches into supply conduits leading to the sulphide burner and to the acid gas burner or using separate supply conduits leading to the sulphide burner and to the acid gas burner. It is preferred to have individual control means to enable regulating the supply of oxygen-containing gas to the sulphide burner independently from the supply of oxygen-containing gas to the acid gas burner.

The method enables disposal of relatively large amounts of mercaptans via disposal of sulphide compounds, even as large as several tonnes of sulphide compounds per day. Suitably, up to 40 tonnes of sulphide compounds per day can be disposed.

The invention will now be illustrated by way of example with reference to the FIGURE. In the FIGURE, a feed gas stream comprising mercaptans is led via line 1 to a sulphide producing zone 2. In the sulphide producing zone, mercaptans are converted to sulphide compounds. The resulting liquid stream comprising sulphide compounds is led via line 3 to a liquid/liquid separator 4 where a separation into a first liquid phase enriched in liquid sulphur and a second liquid phase enriched in sulphide compounds takes place. The first liquid phase enriched in sulphur is led via line 5 to the sulphide producing zone. The second liquid phase enriched in sulphide compounds is led via line 6 to a sulphur dioxide generation zone comprising a sulphide burner 7. Oxygen-containing gas is supplied to the sulphide burner via line 8. Nitrogen gas is optionally supplied as spraying medium to the sulphide burner via line 9. In the sulphide burner, sulphide compounds are combusted to sulphur dioxide and other combustion products. The resulting gas stream comprising sulphur dioxide is led via line 10 to a Claus unit 11. The Claus unit comprises a combustion chamber 12, an acid gas burner 13 and a sulphur producing zone 14. A gas stream comprising hydrogen sulphide is supplied to the acid gas burner via line 15. Oxygen-containing gas is supplied to the Claus furnace via line 16. In the acid gas burner, part of the hydrogen sulphide is converted to sulphur dioxide. Sulphur dioxide and the remaining part of the hydrogen sulphide are reacted in the sulphur producing zone. The elemental sulphur thus-formed is discharged from the Claus unit via line 17.

What is claimed is:

1. A process for disposal of mercaptans, the process comprising the steps of:
   (a) contacting a feed gas stream comprising mercaptans with liquid sulphur in a sulphide producing zone at elevated pressure and at a temperature in the range of from 300 to 450° C. to obtain a liquid stream comprising sulphur and sulphide compounds;
   (b) separating the liquid stream obtained in step (a) into a first liquid phase enriched in liquid sulphur and a second liquid phase enriched in sulphide compounds;
   (c) passing the second liquid phase to a sulphur dioxide generation zone whereby at least part of the sulphide compounds are combusted at elevated temperature in the presence of an oxygen-containing gas in the sulphur dioxide generation zone using a sulphide burner to which burner an oxygen-containing gas is supplied, whereby at least part of the sulphide compounds is converted to sulphur dioxide to obtain a gas stream comprising sulphur dioxide.

2. A process according to claim 1, the process further comprising the step of:

(d) reacting the gas stream comprising sulphur dioxide with hydrogen sulphide in a sulphur producing zone to obtain elemental sulphur.

3. A process according to claim 2, wherein the sulphide burner is coupled to the sulphur producing zone.

4. A process according to claim 3, wherein the temperature at which the sulphide compounds are combusted is in the range of from 700° C. to 1800° C.

5. A process according to claim 4, wherein the amount of oxygen in the oxygen-containing gas fed to the sulphide burner corresponds to an amount of oxygen at least equal to the amount needed to convert the sulphide compounds to sulphur dioxide and to the corresponding combustion products.

6. A process according to claim 5, wherein the sulphide burner is complemented by an acid gas burner of the sulphur producing zone, and a second oxygen-containing gas as well as a gas stream comprising hydrogen sulphide are fed to the acid gas burner to convert at least part of the hydrogen sulphide to sulphur dioxide.

7. A process according to claim 6, wherein the total amount of the oxygen-containing gas and the second oxygen-containing gas is sufficient to combust at least 80% of the sulphide compounds to sulphur dioxide and to convert at least 70% of the hydrogen sulphide to sulphur dioxide.

8. A process according to claim 7, wherein the second liquid phase is sprayed into the sulphide burner in solid or in liquid state.

9. A process according to claim 8, wherein the gas stream of the sulphide burner is adiabatically conveyed to a Claus combustion chamber.

10. A process according to claim 9, wherein the concentration of mercaptans in the feed gas stream is in the range of from 5 ppmv to 1 vol %.

* * * * *